Jan. 12, 1965  R. R. WAREHAM  3,165,043
PHOTOGRAPHIC CAMERA CONSTRUCTION
Filed March 29, 1963  2 Sheets-Sheet 1

INVENTOR.
Richard R. Wareham
BY Brown and Mikulka
ATTORNEYS

Jan. 12, 1965 R. R. WAREHAM 3,165,043
PHOTOGRAPHIC CAMERA CONSTRUCTION
Filed March 29, 1963 2 Sheets-Sheet 2
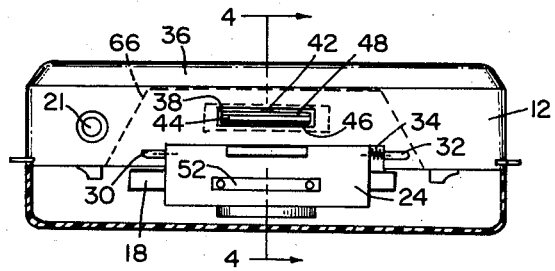
FIG. 3
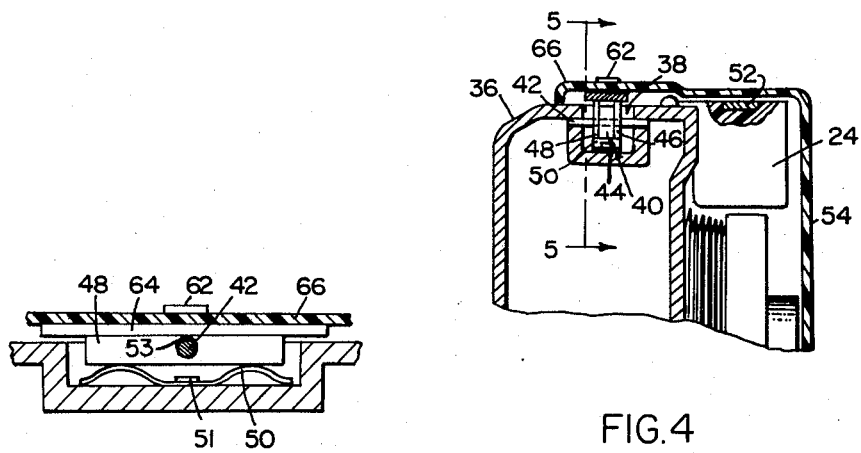
FIG. 5
FIG. 4
INVENTOR.
Richard R. Wareham
BY Brown and Mikulka
ATTORNEYS United States Patent Office 3,165,043
Patented Jan. 12, 1965

3,165,043
PHOTOGRAPHIC CAMERA CONSTRUCTION
Richard R. Wareham, Marblehead, Mass., assignor to Polaroid Corporation, Cambridge, Mass., a corporation of Delaware
Filed Mar. 29, 1963, Ser. No. 268,917
9 Claims. (Cl. 95—44)

The present invention relates to photographic apparatus and more specifically to novel construction of cameras and associated elements.

In the copending application of Herbert A. Bing et al., Serial No. 268,884, for Photographic Range and Viewfinder, there is disclosed a construction for a range and viewfinder which is coupled to the focusing system of the camera to operate in conjunction therewith. Focusing movement is imparted to the camera objective lens through a linkage by movement of a focusing bar or slide in a direction transverse to the optical axis of the camera. Movement of this slide is transmitted to a rotatable mirror which deflects the measuring beam of a coincidence type rangefinder and also to a movable viewfinder objective to correct for parallax. The various elements of both the rangefinder and viewfinder are contained within a single housing which is mounted upon the camera for movement between erected and retracted or folded positions with respect to the camera body. The novel relationships of the various structural elements and the manner of imparting movement from the camera focusing system to the range and viewfinder permits a pivotal mounting of the housing so that it may be rotated about an axis extending substantially through one edge of the housing.

It is well known in the art to provide a protective cover for cameras which may be moved to an open position to allow operation of the camera. The cover, as opposed to a separate carrying case, is attached in some way to the camera and may be retained by means such as a releasable catch, for example, in such a position that at least a portion of the camera elements are enclosed thereby.

It is a principal object of the present invention to provide, in a camera having both a range and viewfinder housing and a protective cover which are movable with respect to the camera body, a novel releasable catch means which may be used for retaining both the housing and the cover in one of their respective positions.

A further object of the invention is to provide novel latching means for releasably retaining an element which is associated with the camera body and movable with respect thereto in a desired position.

Another object is to provide releasable catch means for retaining in an operative position a range and viewfinder system which is adapted to work in cooperation with the focusing system of a camera with which the system is associated, and wherein the system is contained within a housing which is movable with respect to the camera body.

A still further object is to provide, in combination with a photographic camera, a magnetic type catch for releasably retaining in a desired position one or more elements which are associated with the camera body and movable with respect thereto.

Still another object is to provide a novel and improved camera construction which is compact, simple and reliable in operation and refined in appearance.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a top plan view of the camera of FIGS. 1 and 2, showing the camera cover in the closed position;

FIG. 4 is a side elevational view, partially in section on the line 4—4 of FIG. 3, showing the range and viewfinder housing in the retracted position and the cover closed; and FIG. 5 is a fragmentary view in section taken on the line 5—5 of FIG. 4.

Figure 1:
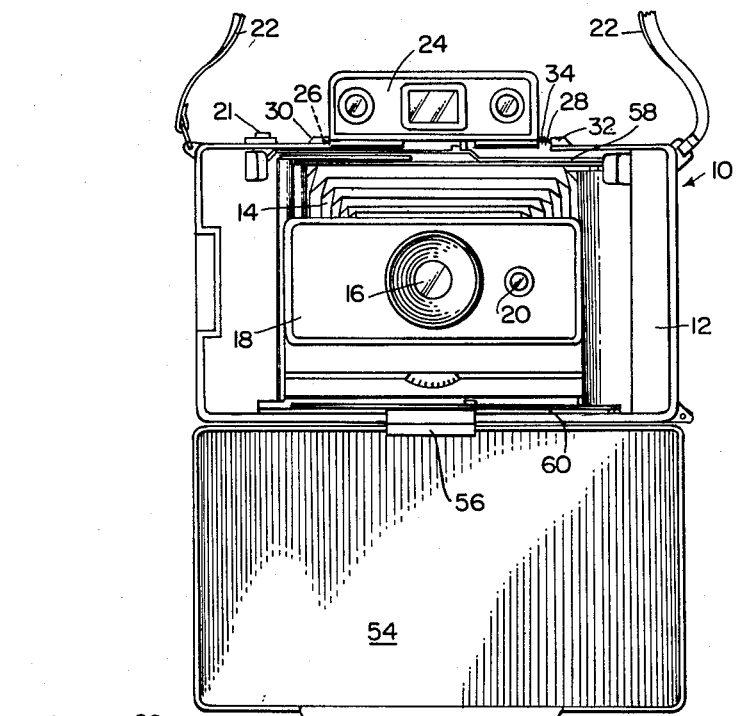
FIGURE 1 is a front elevational view of a photographic camera and associated elements, showing the range and viewfinder housing in the erected position and the camera cover open.

Referring now to the drawings, in all of the various figures is seen a photographic camera, indicated generally by the reference numeral 10. Camera 10 is of the collapsible or folding type, and includes camera body 12, expansible and collapsible bellows 14, objective lens 16 and shutter housing 18. Although the shutter contained by housing 18 may be of any conventional design, the camera of the illustrated embodiment includes a so-called "automatic" shutter which includes photo-responsive means for controlling exposure parameters. Accordingly, shutter housing 18 includes opening 20, behind which is disposed, for receiving light from the scene being photographed, a photosensitive cell. The shutter may be actuated by manual depression of shutter release button 21 which is mounted on body 12. Carrying strap 22 is attached to camera 10 in conventional fashion.

Housing 24, which contains the structural and optical elements of a range and/or viewfinder, is mounted upon camera body 12 by means of hinge pins 26 and 28 which extend into hollow portions 30 and 32, respectively, of body 12. Housing 24 is pivotally movable about an axis through hinge pins 26 and 28 between an erected position, shown in FIGURE 1, and a folded or retracted position, shown in FIG. 2. For purposes of the present invention, the structure contained by housing 24 may comprise, for example, either a rangefinder or a viewfinder, or may be a combined range and viewfinder. A preferred form of such range and viewfinder which is suitable for use with the present invention may be found in the previously-mentioned U.S. application Serial No. 268,884.

As best seen in FIG. 3, coil spring 34 encircles hinge pin 28 and is compressed between housing 24 and portion 32 of camera body 12. Thus, spring 34 exerts a constant bias on housing 24 with respect to body 12 in a direction transverse to the optical axis of the camera; as seen in FIG. 3, housing 24 is urged toward the left. It will be readily understood that, once the optical elements mounted within or upon housing 24 have been properly aligned or otherwise calibrated with respect to the optical axis and the film plane of camera 10, any lateral or sideways movement of housing 24 while in the erected position would be undesirable. That is, it is important to the proper operation of the rangefinder and/or viewfinder that each time housing 24 is placed in the erected position it is in the same relative position to camera body 12.

In top wall 36 of body 12 there is provided opening 38 wherein magnetic element 40 is pivotally mounted upon pin 42. In the illustrated embodiment, magnetic element 40 includes central portion 44, which preferably comprises a permanent magnet such as, for example, a ceramic magnetic, and two pole pieces 46 and 48, which may be formed of a suitable magnetizable metal, disposed one on either side of central portion 44. Pole pieces 46 and 48 are mounted upon pin 42 independently of central portion 44; that is, the three pieces are not fixedly connected to one another or to pin 42 and are thus adapted to rotate independently about the pin.

As best seen in FIG. 5, spring 50 is positioned in opening 38 and exerts a biasing force on both ends of magnetic element 40. Both central portion 44 and pole pieces 46 and 48 are thereby urged against pin 42 and any force tending to rotate magnetic element 40, or any portion thereof, about pin 42 must overcome the bias of spring 50. Hole 51 in pole piece 48 may be seen in FIG. 5 to be slightly larger in diameter than pin 42 which passes therethrough. The same is true of the hole (not shown) in pole piece 46.

Figure 2:
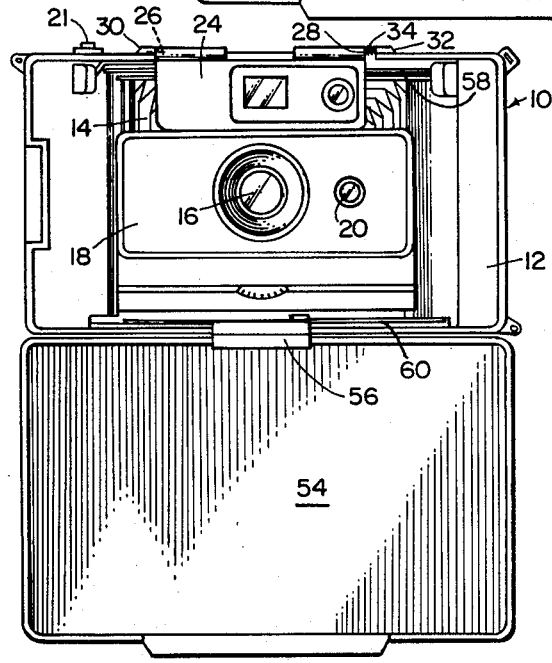
FIG. 2 is also a front elevational view of the camera of FIGURE 1, showing the range and viewfinder housing in the retracted position.

When housing 24 is in the erected position, as seen in FIGURE 1, at least a portion of one surface of the housing will be in contact with magnetic element 40. Plate 52, which comprises a substance which is attracted by magnetic element 40, is fixedly attached to this surface of housing 24 in such a position that it is in contact with the magnetic element when housing 24 is erected. Thus, the housing is retained in the erected position by the magnetic attraction of element 40 for plate 52. The magnetic attraction may be broken by a slight manual pressure on housing 24 tending to rotate it about hinge pins 26 and 28.

Camera 10 also includes front cover 54 which is preferably attached to camera body 12, as, for example, by conventional hinge means 56. When the camera is in use cover 54 is in the position shown in FIGURE 1. Cover 54 is movable about hinge 56 with respect to body 12 to enclose at least the front portion of the camera. In the illustrated embodiment of camera 10, shutter housing 18 is movable between retracted and protracted positions with respect to camera body 12 by means of an erecting system comprising linkages 58 and 60. Such an erecting system is shown and described in detail in the copending U.S. application of Robert S. Borghesani, Serial No. 214,560, filed August 3, 1962, for Photographic Apparatus. In order to close the camera, shutter housing 18 is moved to the retracted position and housing 24 is moved to the folded position of FIG. 2. Cover 54 may then be moved about hinge 54 to cover the front of camera 10 as best seen in FIG. 4.

Fixedly secured, as by rivets 62, to extending lip portion 66 of cover 54 is plate 64, which also comprises a material which is attracted by magnetic element 40. Plate 64 is so positioned that when cover 54 is in the closed or covering position, plate 64 is adjacent magnetic element 40 and is attracted thereby, thus retaining cover 54 is such position. Cover 54 is preferably formed of a slightly pliable or resilient material such as leather or plastic, for example. Therefore, at least extending lip portion 66 of cover 54, to which plate 64 is attached, may be slightly deformed, if necessary, when plate 64 is held in close contact by magnetic element 40.

The mounting of magnetic element 40 upon pin 42 is preferably so arranged that the surfaces of pole pieces 46 and 48 opposite spring 50 (i.e., the surfaces which are contacted by plates 52 and 64) extend slightly beyond the adjacent surface of central portion 44. This is best shown in FIG. 4, wherein both pole pieces may be seen to contact plate 64 while central portion 44 is slightly spaced therefrom. Also, the surfaces of pole pieces 46 and 48 which are contacted by plates 52 and 64 are at least flush with, or extend slightly above surface 36 of camera body 12.

The relative positioning and manner of mounting the elements which has been described above insures that both pole pieces 46 and 48 will be in contact with plate 64 throughout the surfaces adjacent thereto when cover 54 is in the closed position. The same is true of the pole pieces and plate 52 when housing 24 is in the erected position. This arrangement is especially advantageous with respect to housing 24 which includes optical elements which must be properly aligned with the optical axis and focusing system of the camera when the housing is in the erected position. Since magnetic element 40 is pivotally mounted housing 24 will be securely held thereby despite any slight misalignment of the housing and camera body 12 due to, for example, tolerances in the hinged mounting of the housing upon the camera body. When the camera is initially assembled housing 24 may be moved to the erected position and the optical elements thereof properly adjusted with respect to the associated element of the camera. Each time thereafter that housing 24 is moved to the erected position the alignment of the elements will remain the same since spring 34 urges housing 24 into a rest position transverse to the optical axis of the camera. The transverse positioning of the housing is not affected by the latching means used since plate 52 may be contacted at any point by magnetic element 40 with the same result. Also, since magnetic element 40 is pivotally mounted in tends to align itself with plates 52 and 64 when the latter are placed in contact with the element. The fixed mounting of pin 42 upon camera body 12 and the bias of spring 50 on magnetic element 40 insures that housing 24 will always be held in the same position relative to camera body 12 each time it is moved to the erected position.

It may thus be seen that the present invention provides improved means for releasably retaining in an erected position a housing for optical elements which must be properly aligned with respect to other elements of the camera each time the housing is moved from a folded position to the erected position. Pin 42, upon which the magnetic latch is mounted, is accurately and fixedly located with respect to the camera body. Spring 50 urges the magnetic elements into engagement with the pin and spring 34 biases the housing toward a rest position with respect to the camera body, thereby insuring that the housing is always in the same position when erected for use. Spring 50 performs an important function in removing all "play" or blacklash from the latching system in the direction in which the housing would tend to be moved when in use. That is, any pressure on the rear of the housing by the operator when viewing through the housing cannot cause forward rotation of the housing without breaking the magnetic engagement. The same latching or catch means which is used to hold the housing in the erected position may also be used to retain a protective casing or cover for the camera in the covering position when the aforementioned housing is in the folded position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic camera, the combination comprising:
   (a) a camera body;
   (b) an objective lens;
   (c) means for effecting focusing movement of said objective lens;
   (d) optical apparatus movable, when in an operative position, in response to said focusing movement;
   (e) means for mounting said optical apparatus for movement between operative and inoperative positions with respect to said camera body; and
   (f) magnetic catch means for releasably retaining said optical apparatus in said operative position in a desired relationship to said objective lens.

2. The invention according to claim 1 wherein said optical apparatus comprises a combined rangefinder and viewfinder for operation in conjunction with said objective lens.

3. In a photographic camera, the combination comprising:
(a) a camera body;
(b) a first element movable between operative and inoperative positions with respect to said camera body;
(c) a cover movable between open and closed positions with respect to said camera body, said cover enclosing, when in said closed position, at least a portion of said camera; and
(d) magnetic catch means constructed and arranged to releasably retain said first element in said operative position when said cover is in said open position and to releasably retain said cover in said closed position when said first element is in said inoperative position.

4. The invention according to claim 3 wherein said first element comprises a combined rangefinder and viewfinder for said camera.

5. In a photographic camera, the combination comprising:
(a) a camera body;
(b) an objective lens;
(c) means for effecting focusing movement of said objective lens;
(d) optical apparatus movable when in an operative position, in response to said focusing movement;
(e) means for mounting said optical apparatus for movement between operative and inoperative positions with respect to said camera body;
(f) a magnetic element rotatably mounted with respect to said camera body and so positioned with respect thereto that said element engages said optical apparatus when the latter is in its operative position and releasably retains it therein; and
(g) spring means urging said magnetic element into a first position of its rotatable movement, thereby defining said operative position of said optical apparatus.

6. In a photographic camera, the combination comprising:
(a) a camera body;
(b) a housing for optical apparatus;
(c) means for mounting said housing upon said camera body for pivotal movement between erected and folded positions with respect thereto;
(d) first spring means urging said housing in a first direction lateral to said pivotal movement;
(e) a magnetic element rotatably mounted with respect to said camera body and so positioned with respect thereto that said element engages said optical apparatus when the latter is in its operative position and releasably retains it therein; and
(f) second spring means urging said magnetic element into first position of its rotatable movement, thereby cooperating with said first spring means to define said operative position of said optical apparatus.

7. The invention according to claim 6 wherein said optical apparatus comprises a combined rangefinder and viewfinder for said camera.

8. In a photographic camera, the combination comprising:
(a) a camera body;
(b) a housing for optical apparatus;
(c) means for mounting said housing upon said camera body for pivotal movement between erected and folded positions with respect thereto;
(d) a cover hingedly attached to said camera body for movement with respect thereto between an open position and a closed position, wherein said cover encloses at least a portion of said camera;
(e) a magnetic element rotatably mounted with respect to said camera body and so positioned with respect thereto that said element engages said optical apparatus when the latter is in its operative position and releasably retains it therein; and
(f) spring means urging said magnetic element into a first position of its rotatable movement, thereby defining said operative position of said optical apparatus.

9. The invention according to claim 8 wherein said magnetic element includes a plurality of pole pieces, each of which is independently rotatably mounted, and each urged toward said first position by said spring means.

No references cited.